United States Patent
Bowden et al.

(10) Patent No.: US 6,829,908 B2
(45) Date of Patent: Dec. 14, 2004

(54) FABRICATION OF INCLUSION FREE HOMOGENEOUS GLASSES

(75) Inventors: Bradley F. Bowden, Alfred, NY (US); Kenneth E. Hrdina, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 13 days.

(21) Appl. No.: 10/086,238

(22) Filed: Feb. 27, 2002

(65) Prior Publication Data

US 2003/0159465 A1 Aug. 28, 2003

(51) Int. Cl.[7] ............................................. C03B 19/12
(52) U.S. Cl. ......................... 65/17.2; 65/17.3; 264/86; 264/87; 264/637; 264/663
(58) Field of Search ........................ 65/404, 17.3, 419, 65/17.2; 264/637, 86, 87, 663

(56) References Cited

U.S. PATENT DOCUMENTS

| | | | |
|---|---|---|---|
| 2,326,058 A | | 8/1943 | Nadeau ........................ 100/52 |
| 3,301,635 A | * | 1/1967 | Bergna et al. ................. 23/182 |
| 4,381,931 A | * | 5/1983 | Hunold et al. ................ 65/17.5 |
| 4,462,818 A | * | 7/1984 | Wolfe et al. ................. 264/604 |
| 4,501,602 A | | 2/1985 | Miller et al. ................. 65/18.2 |
| 4,772,303 A | * | 9/1988 | Kamiya et al. ............... 65/419 |
| 4,938,788 A | * | 7/1990 | Segawa et al. ............... 65/404 |
| 5,043,002 A | | 8/1991 | Dobbins et al. .............. 65/3.12 |
| 5,152,819 A | | 10/1992 | Blackwell et al. ........... 65/3.12 |
| 5,154,744 A | | 10/1992 | Blackwell et al. ........... 65/3.12 |
| 5,185,020 A | * | 2/1993 | Satoh et al. .................. 65/404 |
| 5,244,485 A | * | 9/1993 | Hihara et al. ................. 65/412 |
| 5,686,728 A | | 11/1997 | Shafer ..................... 250/492.2 |
| 5,736,206 A | * | 4/1998 | Englisch et al. ........... 428/34.6 |
| 5,866,062 A | * | 2/1999 | Moritz et al. ................ 264/637 |
| 5,970,751 A | | 10/1999 | Maxon et al. ................ 65/414 |
| 6,013,399 A | | 1/2000 | Nguyen ........................ 430/5 |
| 6,299,318 B1 | | 10/2001 | Braat ........................ 359/856 |

FOREIGN PATENT DOCUMENTS

| | | | |
|---|---|---|---|
| EP | 0 903 605 A2 | 3/1999 | ........... G02B/13/14 |
| EP | 1 106 582 A2 | 6/2001 | ........... C03B/19/10 |
| WO | WO 00/48775 | 8/2000 | |
| WO | WO 01/07967 | 2/2001 | ............ G03C/5/00 |
| WO | WO 01/08163 | 2/2001 | ............ G21K/5/00 |
| WO | WO 01/75522 | 10/2001 | ............. G03F/1/14 |
| WO | WO 02/26647 | 4/2002 | ......... C03B/37/016 |
| WO | WO 02/32616 | 4/2002 | ........... B23P/13/04 |
| WO | WO 02/32622 | 4/2002 | ............. B24B/7/24 |

OTHER PUBLICATIONS

P. Shultz & H. Smith, Ultra–Low–Expansion Glasses and Their Structure in the $SiO_2$–$TiO_2$ System, Amorphous Materials, papers presented to the Third International Conference on the Physics of Non–Crystalline Solids, held at Sheffield University, Sep. 1970.

George H. Beall, Industrial Applications iof Silica, Reviews in Mineralogy, vol. 29 (Silica), (1994), 469–505.

Charles Gwyn et al., Extreme Ultraviolet Lithography, Nov. 1999, 97–141.

(List continued on next page.)

Primary Examiner—Sean Vincent
(74) Attorney, Agent, or Firm—Timothy M. Schaeberle; Kevin M. Able

(57) ABSTRACT

The present invention relates to a method for forming an optical blank. The method includes providing a green body that has a non-porous exterior portion and a porous interior portion. The interior portion is evacuated to create a vacuum in the interior portion. The green body is then pressed using a hot isostatic pressing technique to densify the green body into a solid glass optical blank. This method produces homogeneous optical blanks having substantially no striae. The method also produces dense, inclusion free glass. As a result, scattering is substantially reduced when EUV light is reflected from a component produced from optical blank employing the method of the present invention.

27 Claims, 4 Drawing Sheets

OTHER PUBLICATIONS

EUV Lithography NGL Technology Review, Jun. 9, 1999, Chicago, Illinois.

Charles Gwyn et al., Extreme Ultraviolet Lithography, 1–6.

William M. Tong et al., Substrates Requirements For Extreme Ultraviolet Lithography, Information Science & Technology, Lawrence Livermore National Laboratory, Dec. 1999.

O.V. Mazurin et al., Crystallizaiton of Silica and Titanium Oxide–Silica Corning Glasses (Codes 7940 & 7971), Journal of Non–Crystalline Solids 18, (1975) 1–9.

Isimoto Co. Ltd., Purity and Chemical Reactivity, http://www.isimoto.com/isimoto/english/feature1.html, 1–3, May 17, 1999.

Isimoto Co. Ltd., Product Information, http://www.isimoto.com/isimoto/english/product info.html, 1–4, May 17, 1999.

Rapid Prototyping, http://mtiac.iitri.org/pubs/rp/rp1.htm.

Products: SLS (R) Systems—Introduction, Vanguard™ and Vanguard™ HS, http://www.3dsystems.com/products/sls-systems/vanguard/index.asp?promo=.

Corning, Semiconductor Materials ULE Zero Expansion Glass, http://www.corning.com/semiconductormaterials/products_services/ule.asp.

Richard H. Stulen et al., Extreme Ultraviolet Lithography, IEEE Journal of Quantum Electronics, vol. 35, No. 5, May 1999, 694–699.

* cited by examiner

FABRICATION OF INCLUSION FREE HOMOGENEOUS GLASSES

BACKGROUND OF THE INVENTION

1. Field of the Invention

The present invention relates generally to a method for making glass, and particularly to a method for making inclusion free homogeneous glass.

2. Technical Background

Integrated circuits (ICs) are fabricated using microlithographic systems. The goal of IC manufacturers is to produce integrated circuits having linewidths as small as possible. Most of the microlithographic systems currently in use employ transmission optics. The typical system includes an illumination source coupled to an illumination optics assembly which provides a photomask with illumination light. The illumination optics expand and collimate the laser light to thereby homogenize the light intensity. The photomask carries the image of an integrated circuit. The photomask is positioned between the illumination optics and a projection optical system. The projection optical system projects the image of the integrated circuit onto the semiconductor substrate. Both the illumination optical system, the photomask, and the projection optical system employ transmission optics. It was once thought that the limit of making integrated circuits using transmission optics would be somewhere around one micron; however, various improvements have been made such that one-tenth micron feature sizes are currently being produced.

One way of reducing the linewidth is to improve the quality of the optical components. Another way of reducing the linewidth is to reduce the wavelength of the laser light source. For example, KrF lasers, which operate at a wavelength of 248 nm, are capable of producing integrated circuits having linewidths approaching 120 nm. ArF lasers represent an improvement over KrF lasers, operating at a wavelength of 193 nm. With improvements to the transmission optics, integrated circuits can potentially be produced with linewidths as small as 70 nm. Designers are now considering $F_2$ lasers. These lasers operate at a wavelength of 157 nm. $F_2$ lasers hold the promise of producing integrated circuits having linewidths on the order of 50 nm.

While it may be possible to further reduce the operating wavelength of light sources used in illumination systems, the very use of transmission optics is becoming a limiting factor. The problem is that the glass materials currently employed in light transmission systems are not transparent at shorter wavelengths. Integrated circuit manufacturers have seen this problem coming for some time and are investigating ways of overcoming the above described limitations.

In one very promising approach, designers are considering reflective optical microlithographic systems that employ extreme ultraviolet (EUV) illumination sources. EUV systems operate at wavelengths in an approximate range between 11 nm and 13 nm. Instead of transmitting light through lens systems, reflective optical systems employ mirrors to direct the light onto the semiconductor substrate. The photomasks used in EUV systems are also reflective. Because the wavelengths in EUV systems are so short, any irregularity present on the surface of a mirror will significantly degrade system performance. Thus, the optical blanks used to produce EUV mirrors must be of the highest quality.

Currently, quality optical blanks can be produced using a flame hydrolysis process. A mixture of silica precursor and a very pure titania precursor are delivered in vapor form to a flame forming $SiO_2$—$TiO_2$ soot particles. The soot particles melt in layers into a solid fused silica optical blank. While this method can be used to produce high quality optical components for transmissive devices, this method has drawbacks when it is used to make EUV compatible optical components. One problem being encountered in the fabrication of mirrors is the presence of striae in the optical blank. The striae are formed as layers of soot are deposited during the flame hydrolysis process. Striae are less of an issue in photomasks than in optical components. Striae result in mid-frequency surface roughness. Another problem encountered is low frequency inhomogeneity which causes a phenomenon known as springback. Springback refers to the shape change of a glass object with a non-uniform coefficient of thermal expansion (CTE). The change in shape typically occurs upon removal of material from the glass object.

Another drawback relates to the presence of inclusions within the glass. Inclusions are either solid impurities or gaseous bubbles disposed within the glass. The occurrence of inclusions in glass made using the flame hydrolysis process is low, but improvements are always desired, especially for glass used in EUV applications.

What is needed is a method for producing EUV compatible optical blanks for use in reflective microlithography. A method is needed to produce homogeneous optical blanks having substantially no striae. Further, a method is needed to produce fully dense, and substantially inclusion free glass.

SUMMARY OF THE INVENTION

The present invention relates to a method for producing optical blanks for EUV microlithographic components. The present invention provides a method for producing homogeneous optical blanks having substantially no striae. The method of the present invention produces dense, substantially inclusion free glass. As a result, scattering is substantially reduced when EUV light is reflected from a component produced from the optical blank.

One aspect of the present invention, the present invention includes a method for forming an optical blank. The method includes providing a green body. The green body includes a non-porous exterior portion and a porous interior portion. The interior portion is evacuated to thereby create a vacuum in the interior portion. The green body is pressed using a hot isostatic pressing technique, whereby the green body is densified into a solid glass optical blank.

In another aspect of the present invention, the present invention includes a method for forming an optical blank. The method includes providing a green body having a non-porous exterior portion. The green body is a vitreous container having a hollow interior enclosed by a porous interior wall, the hollow interior being characterized by a volume capacity. The vitreous container is filled with a glass powder. A volume of the glass powder filling the vitreous container is substantially equal to the volume capacity of the vitreous container. The interior portion is evacuated to thereby create a vacuum in the hollow interior. The vitreous container is heated to render the vitreous container plastic. The temperature of the glass powder is raised to an appropriate compacting temperature. An external pressure is applied to the vitreous container. The external pressure collapses the vitreous container about the glass powder disposed within the vitreous container. The glass powder is fully densified to thereby form a solid glass optical blank. Subsequently, the densified solid glass optical blank is cooled.

In another aspect of the present invention, the present invention includes a method for forming an optical blank. The method includes providing a green body. The green body includes a non-porous exterior portion and a porous interior portion, the interior portion being a porous solid. The interior portion is evacuated to create a vacuum in the interior portion. The green body is heated to render the green body plastic. The temperature of the porous interior portion is raised to an appropriate compacting temperature. An external pressure is applied to the green body. The external pressure collapses the green body until the interior portion is fully densified, whereby a solid glass optical blank is formed. Subsequently, the densified solid glass optical blank is cooled.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts.

In accordance with the invention, the present invention includes a method for forming an optical blank. The method includes providing a green body. The green body includes a non-porous exterior portion and a porous interior portion. The interior portion is evacuated to create a vacuum. The green body is pressed using a hot isostatic pressing technique, whereby the green body is densified into a solid glass optical blank. The present invention provides a method for producing homogeneous optical blanks having substantially no striae. The method of the present invention produces dense, and substantially inclusion free glass. As a result, scattering is substantially reduced when EUV light is reflected from a component produced from the optical blank.

Figure 1:
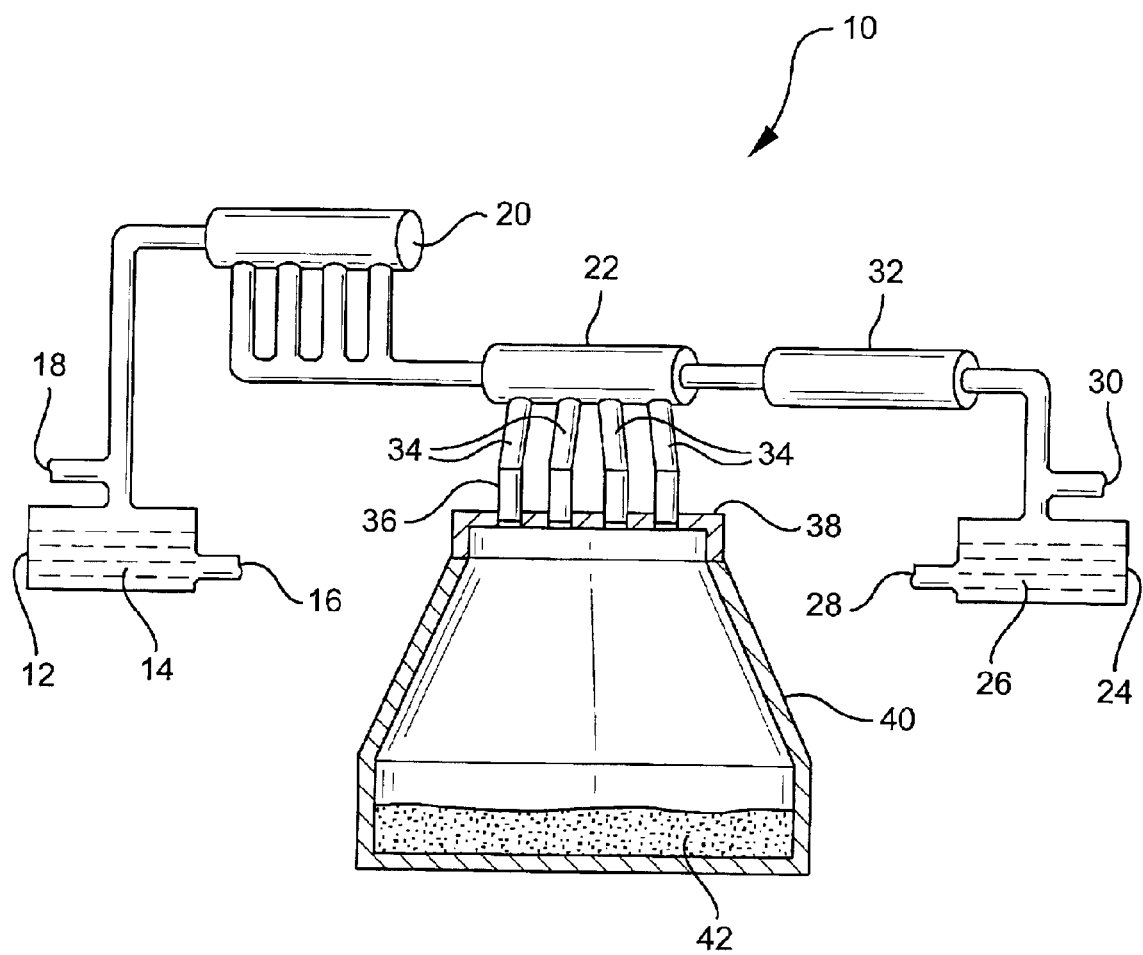
FIG. 1 is a schematic of a system for producing soot particles in accordance with one embodiment of the present invention.

As embodied herein, and depicted in FIG. 1, a schematic of system 10 for producing soot particles in accordance with one embodiment of the present invention is disclosed. System 10 includes a source of silica precursor 14. A carrier gas 16, such as nitrogen, is introduced at or near the base of source 12. A bypass stream of carrier gas is introduced at 18 to prevent saturation of the vaporous stream. The vaporous stream passes through distribution system 20 to manifold 22. System 10 also includes source 24 of the titania precursor 26. Source 24 also has inlet 28 for a carrier gas that is transmitted through precursor material 26. A by-pass stream is introduced at 30. The vaporous stream passes through distribution system 32 to manifold 22.

The silica vapor stream and the titania vapor stream mix in manifold 22. The mixture passes through fume lines 34 to burners 36 mounted in upper portion of furnace 38. The mixed vapor stream is further joined with a fuel/oxygen mixture at burners 36. The vapor stream combusts and is oxidized to form silica-titania particles at a temperature in excess of 1600° C. The particles cool and are directed into collection chamber 40. There the particles form a layer of pure ULE or HPFS soot 42.

In another embodiment, soot particles 42 are formed as a by-product of a flame hydrolysis process used to make the ultra-low expansion (ULE) glass and High Purity Fused Silica (HPFS) glass manufactured by Corning Incorporated. In this embodiment, after the vapor stream combusts and is oxidized, forming silica-titania particles, the particles are directed into a cup in the refractory furnace where they melt to form a green body. However, a significant portion of the glass particles 42 are deposited in the cup, but rather are drawn out of the furnace where they cool and are collected in a bag house. One problem associated with this method is the presence of many impurities and foreign materials in the bag house. Many of these contaminants find their way into the bag house. Of course, these impurities may be removed by filtering the air. In another embodiment, a glass powder is made from a sol-gel process using TEOS and TPT precursors.

Figure 2:
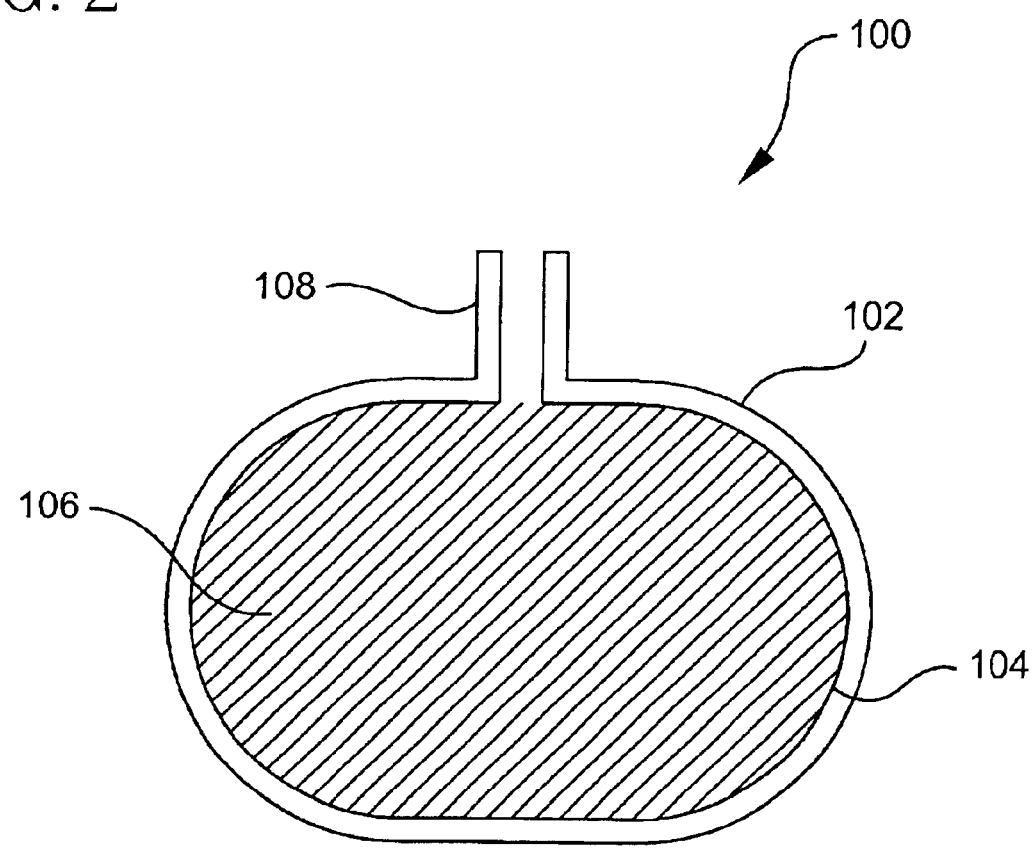
FIG. 2 is a cross-sectional view of a vitreous container in accordance with one embodiment of the present invention.

As embodied herein and depicted in FIG. 2, a cross-sectional view of vitreous container 100 in accordance with one embodiment of the present invention is disclosed. Container 100 is formed from the ULE soot using a slip casting technique. Of course, the ULE soot is obtained from one of the two methods described above. After obtaining the ULE soot, an aqueous suspension containing between 40 and 75 weight percent soot is prepared. The suspension is dispersed using ammonia hydroxide. The suspension is poured into the mold and allowed to cast for approximately five minutes. The mold is continually being refilled during this time to replenish the volume lost due to water being drawn out of the aqueous suspension. Once a sufficient wall thickness (about ⅛") is obtained, the remaining suspension is poured out of the mold. Container 100 is allowed to dry over the course of several days to ensure that it has sufficient strength to withstand de-molding.

After the casting process, container 100 is further dried to eliminate any residual moisture. One possible furnace schedule used for drying green bodies includes heating at 1° C./minute to 100° C., followed by heating at 2° C./minute until the temperature reaches 1000° C. The last heating cycle is followed by a furnace cooling cycle. The schedule accomplishes the tasks of drying, organic impurity burnout, and pre-sintering.

If the green body is produced using high purity soot (see FIG. 1) or by the sol-gel process, no additional cleaning is necessary. If the soot is formed as a by-product of the flame hydrolysis process used to make the ultra-low expansion (ULE) glass and High Purity Fused Silica (HPFS) glass manufactured by Corning Incorporated, then it may be cleaned because it may contain impurities and/or other foreign materials. When the soot is formed as a by-product of ULE or HPFS processes, little effort is made to maintain their purity when they are collected in the bag house.

High temperature chlorine gas treatment is a technique used to remove impurities such as alkalis, iron, and water from porous bodies. At high temperatures, chlorine gas reacts with the impurities to form compounds which are vaporized and carried out of the substrate with flowing chlorine and a carrier gas such as helium or oxygen. The chlorine treatment reduces contamination from both the soot forming and the green body forming processes. Furthermore, a significant amount of impurities observed in the final glass body can be attributed to green body forming operations. To be effective, the chlorine gas must diffuse through he porosity of the part and reach the surface of the soot particles.

Table I provides an example of a schedule used for chlorine treatment of ULE green bodies. During each chlorine cycle a mixture of 20% helium and 80% chlorine gas flows within the furnace for one hour. The furnace reaches a maximum pressure of about 500 torr. After one hour the chlorine flow is arrested and the furnace is evacuated to about 5 torr with continued helium flow. The vacuum is maintained for thirty minutes after which another cycle begins.

TABLE I

| Segment | Set Point (° C.) | Heating Rate (° C./min) | Conditions |
| --- | --- | --- | --- |
| 1 | 825 | 2 | Vacuum w/minimum He flow |
| 2 | 825 | - - - | Up to 6 chlorine cycles |
| 3 | Room Temp. | Furnace Cool | Vacuum w/minimum He flow |

Table II provides the impurity concentrations in powder processed ULE samples before and after chlorine treatment. This chlorine treatment consisted of three treatment cycles at 825° C.

TABLE II

| Units (PPM) | Slip Cast Soot/Cullet (Before Treatment) | Slip Cast Soot/Cullet (After treatment in middle of the furnace) |
| --- | --- | --- |
| Al | 350 | 30 |
| Fe | 450 | 6.3 |
| K | 995 | <0.1 |
| Na | 165 | 19 |
| Zr | 5410 | 570 |

Referring back to FIG. 2, after drying and cleaning, exterior portion 102 is flame polished to close the exterior porosity of container 100, enabling container 100 to hold a vacuum. Thus, container 100 includes non-porous exterior portion 102 and porous interior portion 104. Container 100 is filled with ULE soot 106 formed by one of the two methods previously described. Stem 108 is formed from glass having the same composition as container 100, and fused to the body of container 100. Container 100 is placed under vacuum using a simple mechanical pump. Container 100 is hermetically sealed by heating and twisting stem 108 to create a good seal. Subsequently, container 100 is hot pressed at a temperature above the annealing point ($10^3$ P)but typically below the softening point ($10^{7.65}$ P) of the glass. For example, ULE soot can be consolidated at temperatures between 925° and 1650° C., the approximate strain point and softening point, respectively, of ULE glass. It is important to note that container 100 must be able to plastically deform to claim the benefits of hot isostatic pressing. In one embodiment, the temperature of the glass is raised to a temperature slightly above its melting temperature to remove any solid inclusions. Those of ordinary skill in the art will recognize that container 100 may be formed using other methods, such as vacuum casting, or by glass blowing.

Figure 3:
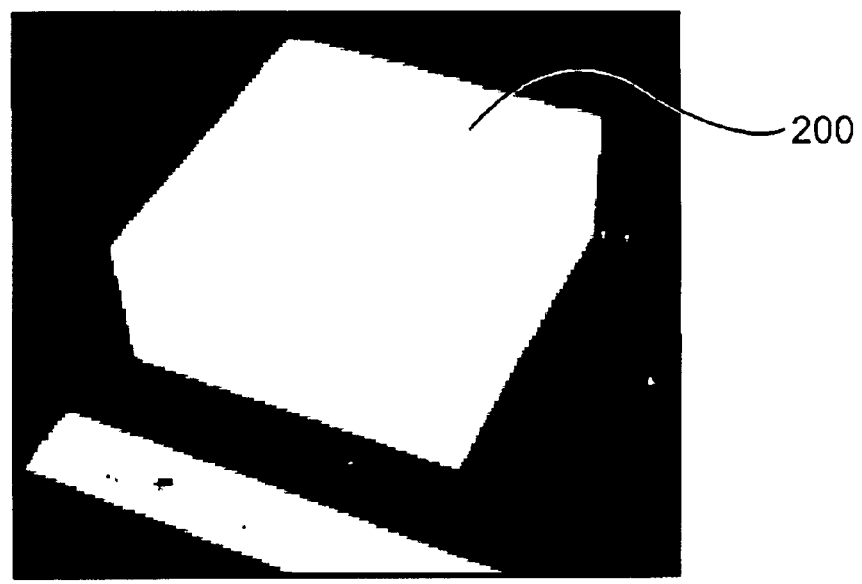
FIG. 3 is a perspective view of a green body produced in accordance with another embodiment of the present invention.
Figure 4:
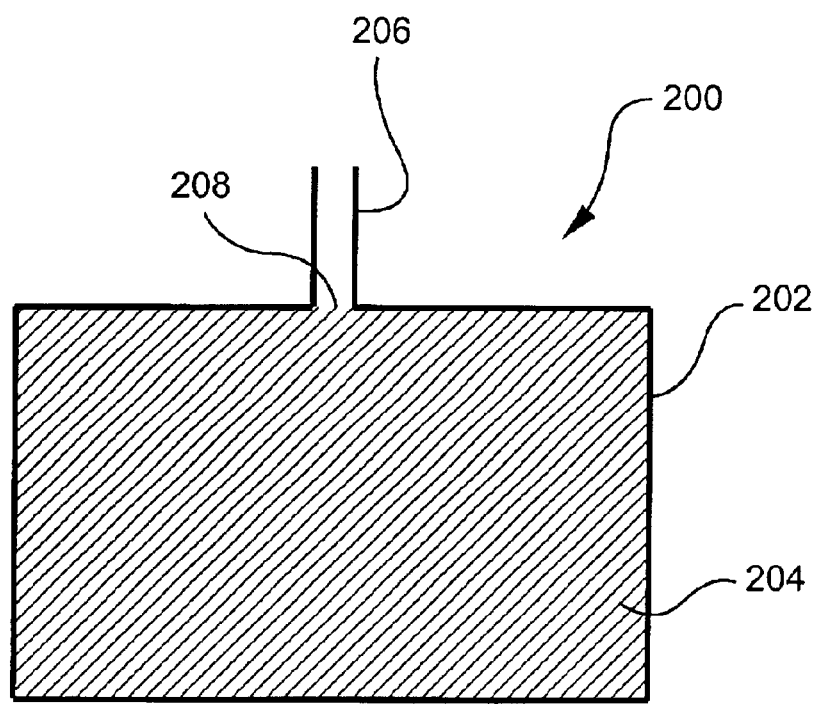
FIG. 4 is a cross-sectional view of the green body depicted in FIG. 3.

As embodied herein and depicted in FIG. 3, a perspective view of a green body produced in accordance with another embodiment of the present invention is disclosed. FIG. 4 is a cross-sectional view of the green body depicted in FIG. 3. In this embodiment, solid green body 200 is cast instead of making hollow container 100. In doing so, ULE cullet is ground and mixed with ULE soot. The mixed ULE particles are gradually mixed with water to create a 70 weight percent soot suspension. The suspension is poured into the mold and allowed to cast. The 70 weight percent suspension provides a green body 200 that exhibits very little shrinkage during casting. After casting, the drying and cleaning steps described above are performed.

After drying and chlorine treatment, exterior portion 202 of body 200 is briefly exposed to extreme heat to close the porosity of surface 202. However, the porosity of interior portion 204 is maintained. Glass stem 206 is fusion sealed onto body 200. Stem 206 has the same composition as green body 200. The porosity of interior portion 204 is exposed by removing a portion of exterior 202 at location 208 within stem 206. The removal can be performed using a drill or by using an etchant. After the interior has been exposed, a vacuum is applied to interior 204. Because porous solid body 200 has a much higher density than container 100, it may be necessary to apply the vacuum for an extended period of time to thereby evacuate the entire green body. Green body 200 is sealed by heating and twisting stem 206.

Subsequently, green body 200 is hot pressed at a temperature above the annealing point ($10^3$ P)but typically below the softening point ($10^{7.65}$ P) of the ULE glass. As discussed above, ULE soot can be consolidated at temperatures between 925 and 1650° C., the approximate strain point and softening point, respectively, of ULE glass. Again, body 200 must be able to plastically deform to claim the benefits of hot isostatic pressing. In one embodiment, the temperature of the glass is raised to a temperature slightly above its melting temperature to remove any solid inclusions.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method for forming an optical blank, the method comprising:

providing a porous green body;

heating the porous green body to form a non-porous exterior portion and a porous interior portion;

forming a vacuum in the porous interior portion; and pressing the portions using a hot isostatic pressing technique, whereby the portions are densified into a solid glass optical blank.

2. The method of claim 1, wherein the step of providing comprises:
   providing glass particles, the glass particles comprising glass soot and ground glass cullet;
   mixing the glass particles with water to form an aqueous suspension; and
   casting the aqueous suspension to form the porous green body.

3. The method of claim 2, wherein the glass soot is formed as a by-product of a flame hydrolysis process.

4. The method of claim 2, wherein the aqueous suspension is a 70 weight percent glass particle suspension.

5. The method of claim 1, further comprising the step of cleaning the porous green body to remove impurities.

6. The method of claim 5, wherein the step of cleaning comprises:
   disposing the porous green body in a high temperature chlorine gas atmosphere, the high temperature being lower than a sintering temperature of the porous green body; and
   treating the porous green body by allowing the chlorine gas to react with the impurities for a pre-determined time.

7. The method of claim 6, wherein the high temperature is between 700° C. and 1100° C.

8. The method of claim 1, wherein the aqueous suspension includes an ammonia hydroxide dispersant.

9. The method of claim 1, wherein the step of forming a vacuum comprises:
   fusing a stem onto the portions;
   exposing the porous interior portion;
   drawing a vacuum on the porous interior portion via the stem; and
   hermetically sealing the portions.

10. The method of claim 1, wherein the step of providing is performed using a plaster mold.

11. The method of claim 1 wherein the porous interior portion defines a cavity.

12. The method of claim 11 further comprising disposing a glass powder in the cavity.

13. The method of claim 1 wherein the step of heating comprises flame polishing.

14. A method for forming an optical blank, the method comprising:
   mixing glass particles comprising a glass soot with water to form an aqueous suspension;
   pouring the aqueous suspension in a mold, the suspension being allowed to cast in the mold for a predetermined time, whereby a green body wall is formed;
   removing remaining aqueous suspension from the mold to form a porous green body;
   drying the porous green body;
   heating the porous green body to form a non-porous exterior portion and a porous interior portion, the porous interior potion defining a cavity;
   disposing a glass powder in the cavity, the glass powder having substantially the same material composition as the glass particles;
   applying a vacuum to the cavity; and
   pressing the portions about the glass powder using a hot isostatic pressing technique, whereby the portions rand the glass powder are densified into a solid glass optical blank.

15. The method of claim 14, wherein the aqueous suspension is a 70 weight percent glass particle suspension.

16. The method of claim 14, wherein the step of applying includes hot isostatic pressing the portions at a temperature above the annealing point of glass particles but below the softening point of the glass articles.

17. The method of claim 16, wherein the step of applying includes the step of raising the temperature of the portions above the melting temperature of the glass particles to thereby remove any solid inclusions.

18. The method of claim 14, wherein the step of heating comprises flame polishing.

19. The method of claim 14, wherein the aqueous suspension is a 50–70 weight percent glass particle suspension.

20. A method for forming an optical blank comprising:
   providing a porous green body container;
   flame polishing an exterior portion of the container so as to enable the container to hold a vacuum;
   disposing a glass powder within the container;
   forming a vacuum within the container; and
   plastically deforming the container using a hot isostatic pressing technique whereby the container is densified into a solid glass optical blank.

21. The method of claim 20 further comprising the step of fusing a glass stem onto the container.

22. The method of claim 21 wherein the step of forming a vacuum comprises heating and twisting the glass stem so as to seal the container.

23. A method for forming an optical blank comprising:
   providing a porous green body comprising a glass soot;
   heating the body to form a non-porous exterior portion and a porous internal portion;
   fusing a glass stem to the portions;
   exposing the porous internal portion through the glass stem;
   forming a vacuum in the porous internal portion; and
   pressing the portions using a hot isostatic pressing technique, whereby the portions are densified into a solid glass optical blank.

24. The method of claim 23 wherein the step of exposing comprises using an etchant.

25. A method for forming an optical blank comprising:
   forming an aqueous suspension comprising a glass sort;
   casting the aqueous suspension in a mold to form a porous green body;
   heating the body to form a non-porous exterior portion and a porous interior portion;
   forming a vacuum in the porous internal portion;
   plastically deforming the portions using a hot isostatic pressing technique, whereby the portions are densified into a solid glass optical blank.

26. The method of claim 25 wherein the aqueous suspension further comprises ground glass cullet.

27. The method of claim 25 further comprising treating the porous green body in an atmosphere comprising chlorine to remove impurities.

* * * * *